(12) United States Patent
Chaudhry et al.

(10) Patent No.: US 7,590,830 B2
(45) Date of Patent: Sep. 15, 2009

(54) METHOD AND STRUCTURE FOR CONCURRENT BRANCH PREDICTION IN A PROCESSOR

(75) Inventors: Shailender Chaudhry, San Francisco, CA (US); Paul Caprioli, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 113 days.

(21) Appl. No.: 11/068,626

(22) Filed: Feb. 28, 2005

(65) Prior Publication Data
US 2005/0268075 A1     Dec. 1, 2005

Related U.S. Application Data

(60) Provisional application No. 60/575,738, filed on May 28, 2004.

(51) Int. Cl.
*G06F 9/00* (2006.01)
*G06F 9/26* (2006.01)

(52) U.S. Cl. .................. 712/239; 711/204; 712/240

(58) Field of Classification Search .......... 712/239, 712/240; 711/204
See application file for complete search history.

(56) References Cited

U.S. PATENT DOCUMENTS

| | | | | |
|---|---|---|---|---|
| 5,434,985 A | * | 7/1995 | Emma et al. ................ | 712/240 |
| 5,592,634 A | * | 1/1997 | Circello et al. .............. | 712/239 |
| 5,671,231 A | * | 9/1997 | Cooper ....................... | 714/724 |
| 5,752,263 A | * | 5/1998 | Kranich ....................... | 711/137 |
| 5,926,840 A | * | 7/1999 | Gold et al. ................... | 711/169 |
| 5,961,654 A | * | 10/1999 | Levine et al. ................. | 714/47 |
| 5,968,169 A | * | 10/1999 | Pickett ........................ | 712/239 |
| 6,035,387 A | * | 3/2000 | Hsu et al. .................... | 712/210 |
| 6,052,708 A | * | 4/2000 | Flynn et al. ................. | 718/108 |
| 6,253,316 B1 | * | 6/2001 | Tran et al. .................... | 712/239 |
| 6,272,624 B1 | | 8/2001 | Giacalone et al. | |
| 6,289,441 B1 | | 9/2001 | Talcott et al. | |
| 6,295,580 B1 | * | 9/2001 | Sturges et al. ............... | 711/129 |

OTHER PUBLICATIONS

International Search Report issued in corresponding PCT Application No. PCT/US2005/018972, mailed Jun. 30, 2006.

Yeh et al, "Increasing the Instruction Fetch Rate via Multiple Branch Prediction and a Branch Address Cache", ACM Sigarch: Proceedings of the 7th International Conference on Supercomputing, 1993, pp. 67-76.

Lee J-B et al, "An Enhanced two-level Adaptive Multiple Branch Prediction for Superscalar Processors", Journal of Systems Architecture, Elsevier Science Publishers, BV., Amsterdam, NL, vol. 45, No. 8, Feb. 1999, pp. 591-602.

(Continued)

*Primary Examiner*—Eddie P Chan
*Assistant Examiner*—William B Partridge
(74) *Attorney, Agent, or Firm*—Gunnison, McKay & Hodgson, L.L.P.; Forrest Gunnison

(57) ABSTRACT

Concurrently branch predicting for multiple branch-type instructions demands of high performance environments. Concurrently branch predicting for multiple branch-type instructions provides the instruction flow for a high bandwidth pipeline utilized in advanced performance environments. Branch predictions are concurrently generated for multiple branch-type instructions. The concurrently generated branch predictions are then supplied for further processing of the corresponding branch-type instructions.

48 Claims, 9 Drawing Sheets

OTHER PUBLICATIONS

Chang, Po-Ying et al., "Alternative Implementations of Hybrid Branch Predictors," Proceedings of the 28th annual international symposium on Microarchitecture, IEEE Computer Society Press, Los Alamitos, CA, 1995, pp. 252-257.

Evers, Marius et al., "Using Hybrid Branch Predictors to Improve Branch Prediction Accuracy in the Presence of Context Switches," Proceedings of the 23rd annual international symposium on Computer architecture, ACM Press New York, NY, 1996, pp. 3-11.

Hammond, L. et al., "A Single Chip Multiprocessor," Theme Feature, IEEE, Sep. 1997, pp. 79-85.

McFarling, S. "Combining Branch Predictors," WRL Technical Note TN-36, Digital Western Research Laboratory, Palo Alto, CA, Jun. 1993, 25 pages.

Yeh, Tse-Yu & Patt, Yale N. "Alternative Implementations of Two-Level Adaptive Branch Prediction," Proceedings of the 19th annual international symposium on Computer architecture, ACM Press New York, NY, 1992, pp. 124-134.

Yeh, Tse-Yu & Patt, "A Comparison of Dynamic Branch Preditors that use Two Levels of Branch History," Proceedings of the 20th annual international symposium on Computer architecture, ACM Press New York, NY, 1993, pp. 257-266.

Yeh, Tse-Yu et al., "Increasing the Instruction Fetch Rate via Multiple Branch Prediction and a Branch Address Cache," Proceedings of the 7th International Conference on Supercomputing, ACM Press New York, NY, 1993, pp. 67-76.

* cited by examiner

METHOD AND STRUCTURE FOR CONCURRENT BRANCH PREDICTION IN A PROCESSOR

BACKGROUND

1. Field of the Invention

The present invention relates to the field of computers. More specifically, the present invention relates to computer architecture.

2. Description of the Related Art

In general, branch predicting utilizes branch prediction history and prior branch resolutions. As branch predictions are generated, they are shifted into a branch history register. In various branch prediction schemes, program counters are hashed together with the branch history to select a branch prediction for a branch-type instruction from a branch prediction table. In addition, another branch prediction technique utilizes multiple instances of branch prediction tables. Each of the branch prediction tables are maintained in accordance with a different branch prediction algorithm. A branch prediction for a single branch-type instruction is selected from the different instances of branch prediction tables and combined into a single branch prediction for the branch-type instruction.

Unfortunately, speculative execution and reliability of branch prediction suffers because branch history does not include history for recent branch-type instructions. As the window of unavailable recent branch predictions grows, then the reliability of branch predictions decreases.. In addition, predicting for a single branch-type instruction is insufficient to meet the demands of high performance processing environments. High performance processing environment face challenges in overcoming the inadequacy of single branch prediction, and in coordinating branch prediction to make recent branch predictions available as a factor in current branch predictions. Accordingly, a branch prediction technique is desired that satisfies the demands of a high performance processing environment.

SUMMARY OF THE INVENTION

It has been discovered that concurrently branch predicting for multiple branch-type instructions satisfies performance demands of a high performance processing environment, such as processing environments that operate at high frequencies with multiple pipelines that share fetch resources. Concurrently branch predicting for multiple branch-type instructions also facilitates availability of branch prediction information of recent preceding branch-type instructions, typically not accounted for in a branch history register. Utilizing branch prediction information for recent preceding branch-type instructions improves reliability of branch predictions. In realizations of the described invention, multiple possible branch predictions for an instruction group are selected. Selection of the multiple possible branch predictions for an instruction group allows sufficient opportunity for a preceding branch prediction to be factored into the branch predictions. Realizations of the described invention drive selection of the appropriates ones of the multiple possible branch predictions with a deterministic technique.

These and other aspects of the described invention will be better described with reference to the Description of the Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE EMBODIMENT(S)

The description that follows includes exemplary systems, methods, techniques, instruction sequences and computer program products that embody techniques of the present invention. However, it is understood that the described invention may be practiced without these specific details. For instance, storing branch predictions for groups of instructions can be implemented with various data structures (e.g., hash tables, binary search trees, etc.) and/or with hardware mechanisms (e.g., hardware tables, content addressable memory, etc.). In other instances, well-known protocols, structures and techniques have not been shown in detail in order not to obscure the invention.

In particular, architecting a high performance processing environment that reconciles high frequency operation, pipeline processing environments with multiple threads, multiple cores, and/or multiple processors process instructions at a high rate. A high bandwidth pipeline for such processing environments is underutilized if the branch predictor lags behind the fetch and/or decode units.

High performance processing environments operate at high frequencies satisfying multiple threads, multiple cores, etc. To satisfy the constraints of space and demand for high performance, certain resources are duplicated while other resources are shared. To attain high pipeline bandwidth for high performance, a high performance processing unit includes multiple pipelines. However, multiple ones of the pipelines share resources, such as a fetch unit. Effective coordination between branch prediction, fetching and decoding facilitates efficient utilization of a high bandwidth pipeline. Efficient utilization of such a pipeline satisfies the performance demands of an environment with multiple concurrently executing entities (cores, processors, threads, etc.).

Coordination of multiple branch predictions with instruction fetching and decoding satisfies an aggressive processing environments, such as the aforementioned high performance processing environments. In addition, branch prediction reliability can be improved with branch prediction results of recent instructions. Conventional branch predictors utilize a branch history register, which is typically stale because of the latency between branch predictions and updating of the branch history register. Concurrently branch predicting for multiple branch-type instructions allows for instrumentation of branch predictions to allow for utilization of recent branch predictions while also satisfying high demand instruction pipeline environments.

Figure 1:
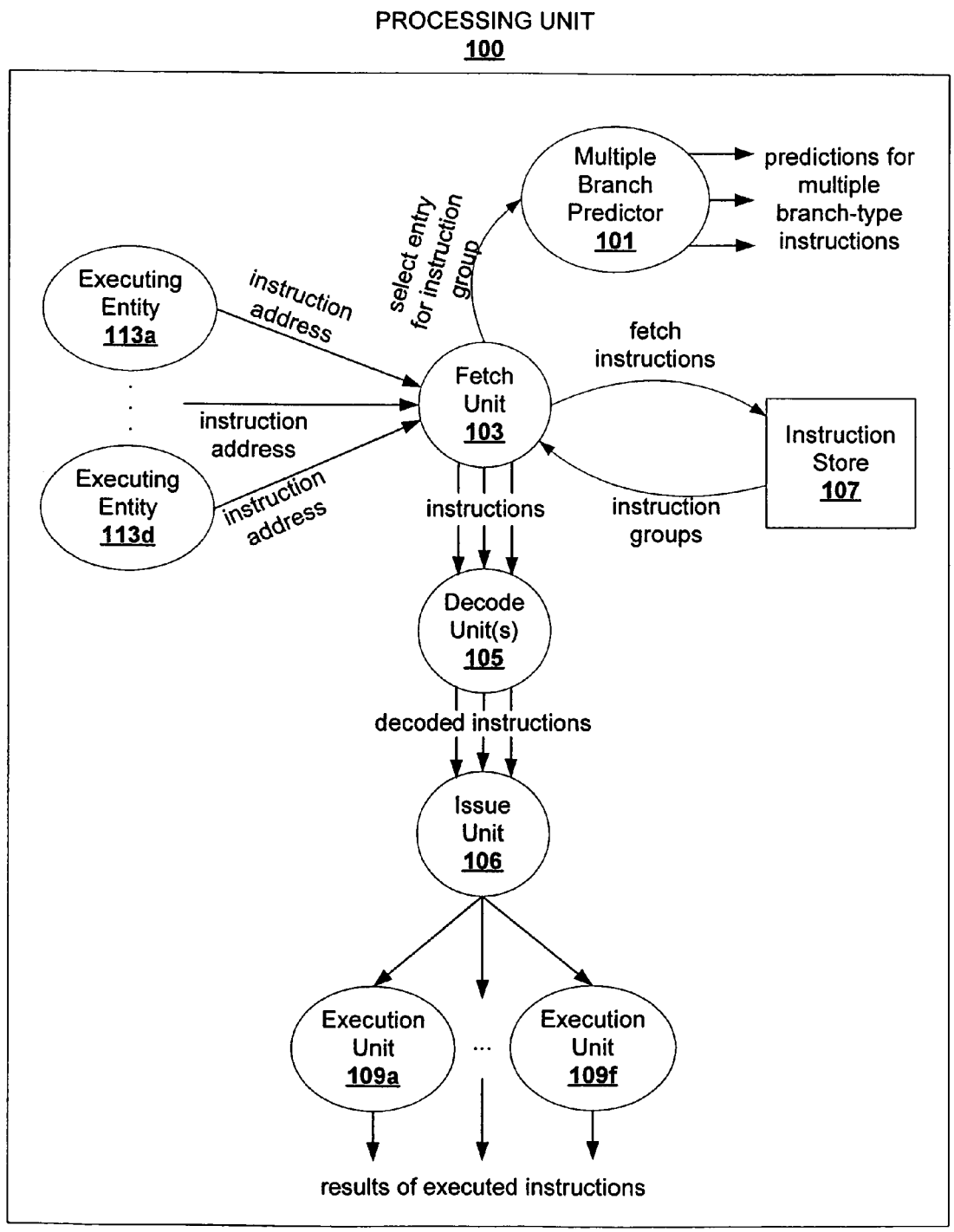
FIG. 1 depicts an exemplary pipeline in an environment with multiple executing entities that supplies predictions for multiple branch-type instructions.

FIG. 1 depicts an exemplary pipeline in an environment with multiple executing entities that supplies predictions for multiple branch-type instructions. A fetch unit 103 receives instruction addresses from executing entities 113a-113d. Exemplary executing entities 113a-113d include cores, processors, threads, etc. The fetch unit 103 fetches instructions from an instruction store 107 (e.g., an instruction cache), and receives groups of instructions. For example, the fetch unit 103 requests a line from the instruction store 107, and receives a group of instructions that are stored at the requested line. For each received instruction group, the fetch unit 103 accesses a multiple branch predictor 101. Branch prediction information for multiple instructions are supplied concurrently (e.g., at approximately the same time, such as within the same cycle, half cycle, etc.) from the multiple branch predictor 101. For example, the multiple branch predictor 101 may host branch prediction information for branch-type instructions of an instruction group and implicit or explicit indication that other instructions of an instruction group are not branch-type instructions. To illustrate, assume that a multiple branch predictor is organized into rows for each instruction group, and that each row includes 16 entries, corresponding to each instruction group having 16 instructions. The entries that correspond to branch-type instructions will indicate a prediction qualifier (e.g., a saturating counter that indicates branch prediction confidence, such as strongly taken, weakly taken, weakly not taken, strongly not taken). For those instruction groups that include multiple branch-type instructions, multiple branch predictions are concurrently supplied for the multiple branch-type instructions.

The fetched instructions are decoded by a decode unit(s) 105. The decoded instructions are then issued by an issue unit(s) 106. The issued instructions are then executed by execution units 109a-109f. The branch prediction information from the multiple branch predictor 101 may be supplied to one or more of the fetch unit 103, the decode unit(s) 105, the issue unit 106, and the execution units.

Figure 2:
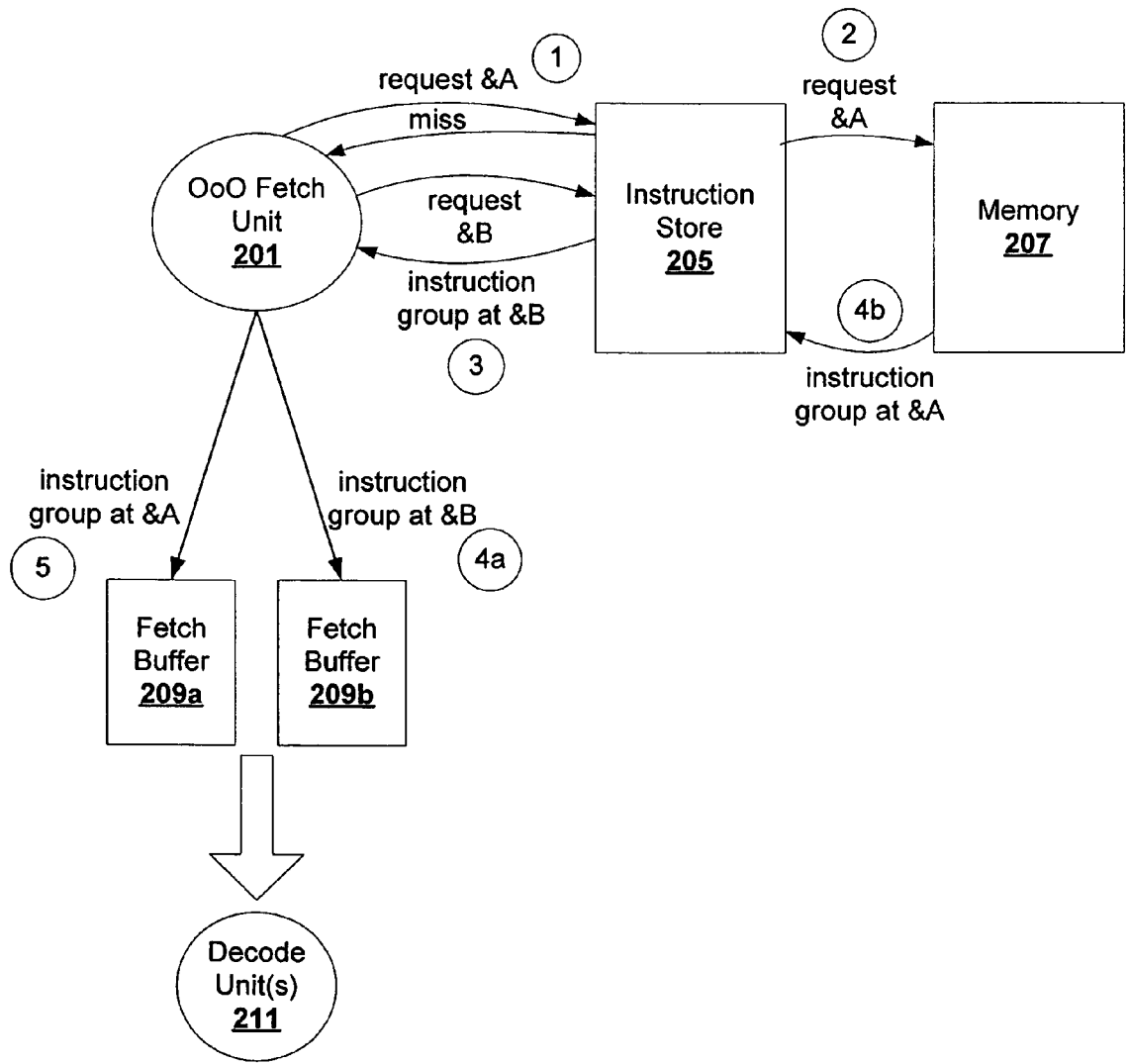
FIG. 2 depicts an exemplary out-of-order fetch unit.

FIG. 2 depicts an exemplary out-of-order fetch unit. An out-of-order fetch unit 201 requests instructions at an address &A from an instruction store 205, at a time 1. The request misses in the instruction store 205. At a time 2, the instruction store 205 requests the instructions at address &A from a memory 207 (e.g., L2 cache, L3 cache, system memory, etc.). Fetch unit 201 requests instructions at an address &B from instruction store 205 and receives a corresponding instruction group, at a time 3. According to program order, the instructions at address &A precede the instructions at address &B. However, fetch unit 201 stores the instruction group from address &B in a fetch buffer 209b, at a time 4a. At a time 4b, instruction store 205 receives the instruction group at address &A from memory 207. At a time 5, the instruction group at address &A is stored in a fetch buffer 209a. A decode unit 211 decodes instructions stored in fetch buffers 209a and 209b. The illustrated timing of these events is exemplary and may vary in realizations of the described invention. For example, the instruction groups may be requested concurrently, the instruction group at address &A and the instruction group at address &B may be received concurrently, the instruction group at address &A may be received from memory 207 prior to the fetch unit storing the instruction group at address &B in the fetch buffer 209b, etc.

Even though the instruction groups at addresses &A and &B are not available in accordance with program order, fetch unit 201 does not stall until fetch unit 201 receives the instruction group at address &A. Instead, fetch unit 201 continues fetching instruction groups from instruction store 205, regardless of program order. Hence, the unavailability of an instruction group in the instruction store does not ripple through the pipeline. When the instruction group at address &A finally arrives and is available for decoding, subsequent instruction groups are readily available for decode unit 211. Such utilization of a fetch unit allows for efficient utilization of an environment that shares fetch resources across multiple pipelines.

Figure 3:
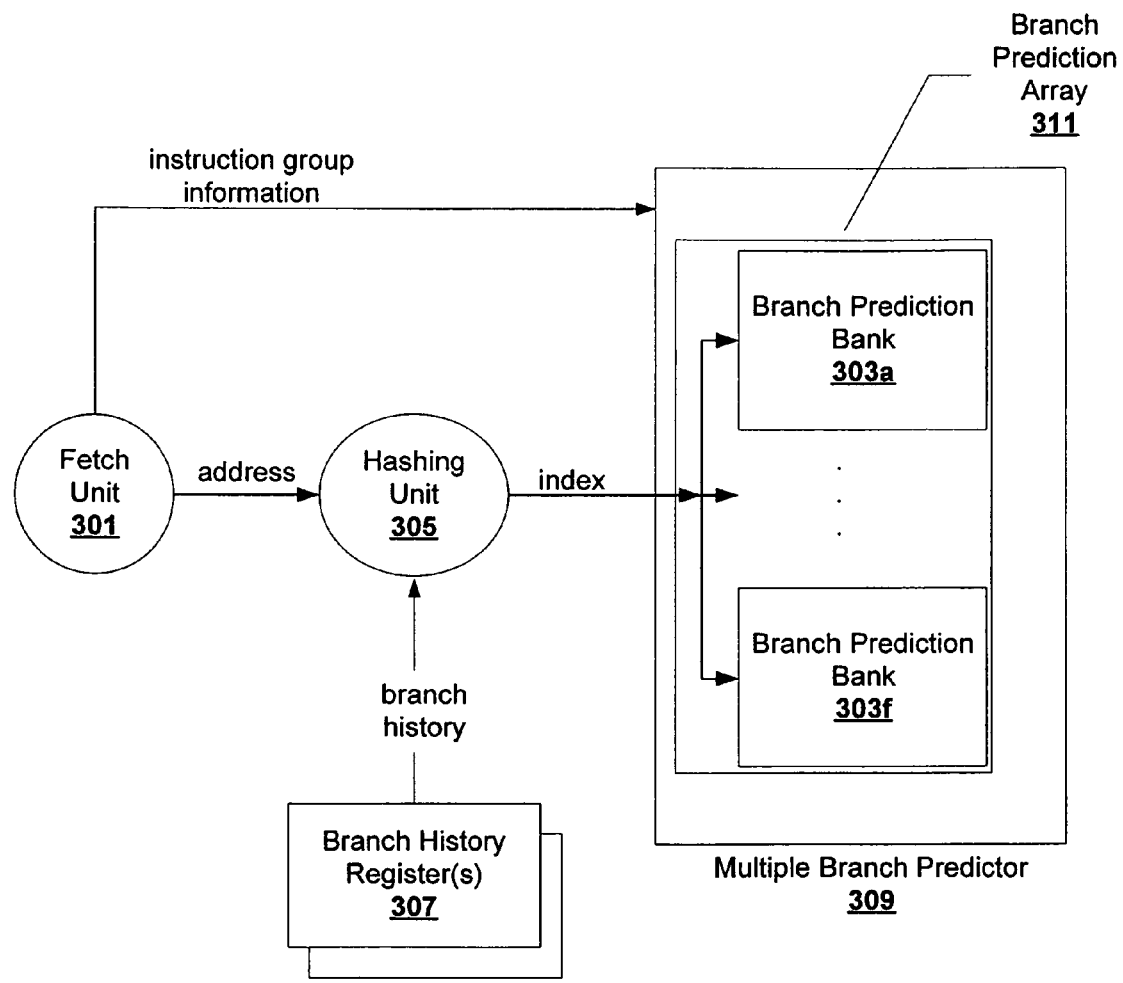
FIG. 3 depicts exemplary accessing of an exemplary multiple branch predictor.
Figure 4:
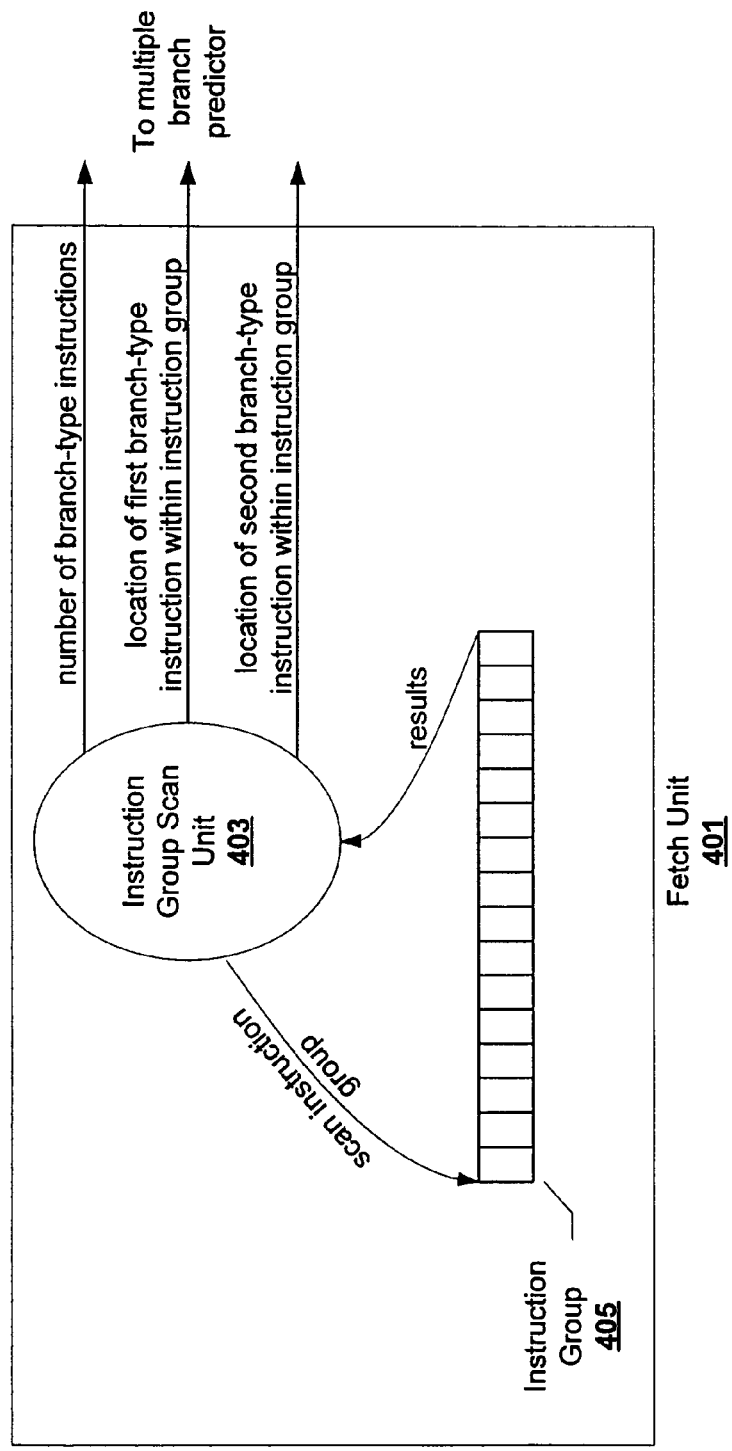
FIG. 4 depicts exemplary scanning of an instruction group.

FIG. 3 depicts exemplary accessing of an exemplary multiple branch predictor. A fetch unit 301 accesses a multiple branch predictor 309 with an instruction group address and information about the instruction group. Exemplary information about the instruction group that flows from the fetch unit 301 to the multiple branch predictor 309 is depicted in FIG. 4. The multiple branch predictor 309 includes a branch prediction array 311, which includes branch prediction banks 303a-303f. Those of ordinary skill in the art will appreciate that the branch predictor can be implemented with a variety of techniques. For example, the branch prediction array may be implemented as a series of hardware tables, logical structures (e.g., hash tables, binary search trees, etc.) instantiated in memory, content addressable memory, etc. In addition, the functionality of the multiple branch predictor that accesses and selects branch prediction entries from the branch prediction array may be implemented with hardware (e.g., address lines, logic gates, etc.), software, a combination of hardware and software, etc.

In the illustrated example, the instruction group address flows into a hashing unit 305. For example, if a portion of an instruction's address (e.g., a program counter) indicates the address of the group that includes the relevant instruction (e.g., a certain number of most significant bits of a program counter), then that portion is supplied from the fetch unit 301. Branch history information from a branch history register(s) 307 also flows into the hashing unit 305. The hashing unit 305 hashes the branch history information with the instruction group address and generates an index into the branch prediction array 311. With the index, a plurality of branch prediction entries are selected in each of the branch prediction banks 303a-303f. Various realizations of the described invention access branch prediction information with different techniques (e.g., a hash of the instruction group address without the branch history, the instruction group address without hashing, etc.). Each entry selected from a bank provides branch prediction information at instruction group granularity. Additional information is garnered (in parallel or prior to selection from the banks), to further filter the selected instruction group branch predictions.

FIG. 4 depicts exemplary scanning of an instruction group. A fetch unit 401 includes an instruction group scan unit 403. The instruction group scan unit 403 scans an instruction group 405. For example, the instruction group scan logic 403 scans the opcode of each instruction within the instruction group 405. From the scanning, the instruction group scan unit 403 can determine a variety of information about the instruction group useful for processing the instructions of the instruction group. In FIG. 4, the instruction group scan unit 403 determines the number of branch-type instructions in the instruction group 405, and the locations of the branch-type instructions in the instruction group 405. In FIG. 4, the instruction group scan unit 403 supplies an indication of the number of branch-type instructions, and locations of a first and a second branch-type instruction. This information is supplied from the fetch unit 401 to a multiple branch predictor, such as the multiple branch predictor 101 of FIG. 1 or the multiple branch predictor 309 of FIG. 3.

Figure 5:
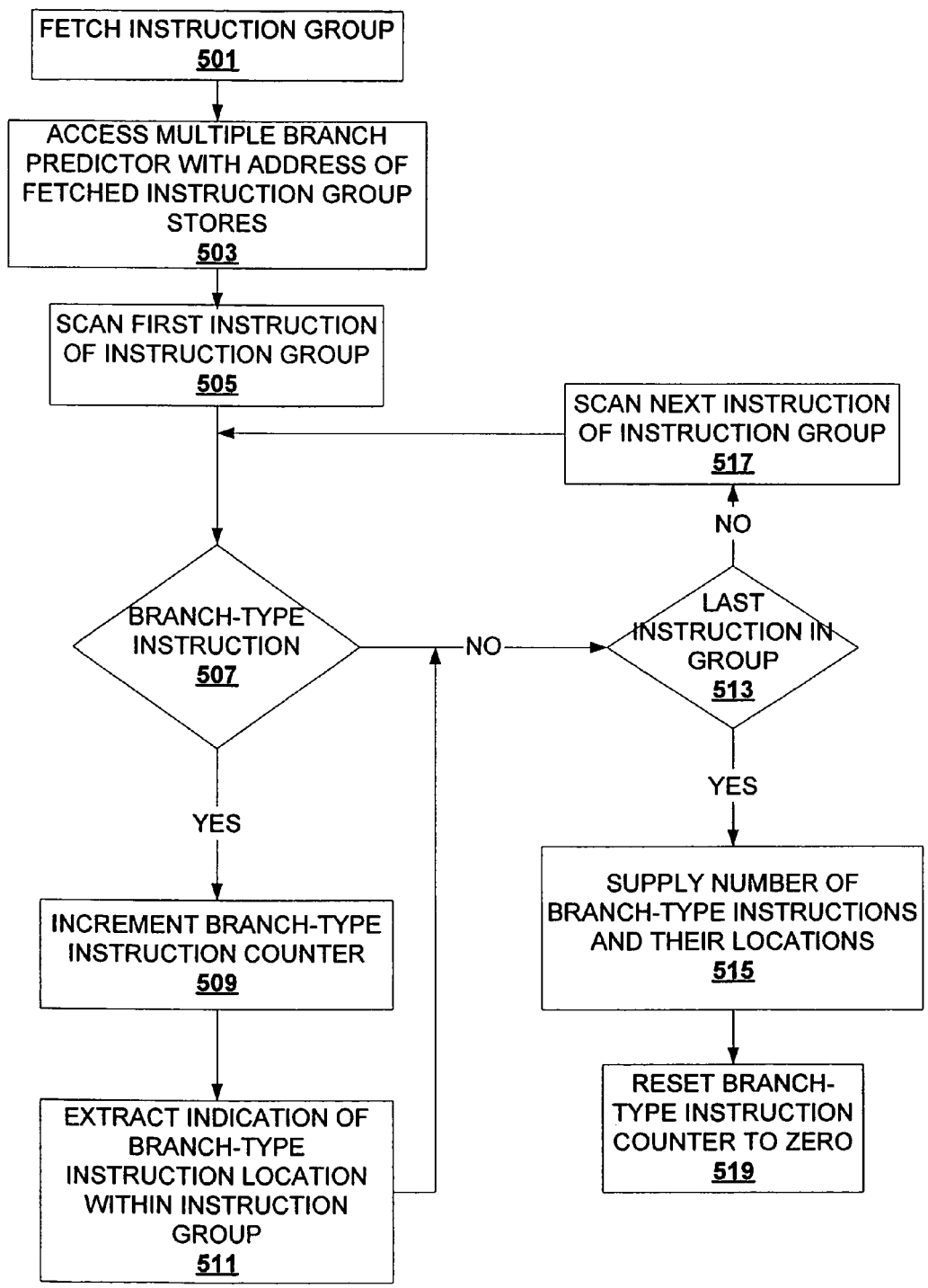
FIG. 5 depicts an exemplary flowchart for fetching and scanning instructions.

FIG. 5 depicts an exemplary flowchart for fetching and scanning instructions. At block 501, an instruction group is fetched. At block 503, a multiple branch predictor is accessed with an address of the fetched instruction group. At block 505, the first instruction of the fetched instruction group is scanned. At block 507, it is determined if the scanned instruction is a branch-type instruction. If the scanned instruction is a branch-type instruction, then control flows to block 509. If the scanned instruction is not a branch-type instruction, then control flows to block 513.

At block 509, a branch-type instruction counter is incremented. At block 511, an indication of location of the branch-type instruction within the instruction group is extracted. Control flows from block 511 to block 513.

At block 513, it is determined if the scanned instruction is the last instruction of the instruction group. If the scanned instruction is not the last instruction of the instruction group, then control flows to block 517. If the scanned instruction is the last instruction of the instruction group, then control flows to block 515.

At block 517, the next instruction of the instruction group is scanned. From block 517, control flows to block 507.

At block 515, the number of branch-type instructions and their locations (if any) are supplied. At block 519, the branch-type instruction counter is reset to zero.

Figure 6:
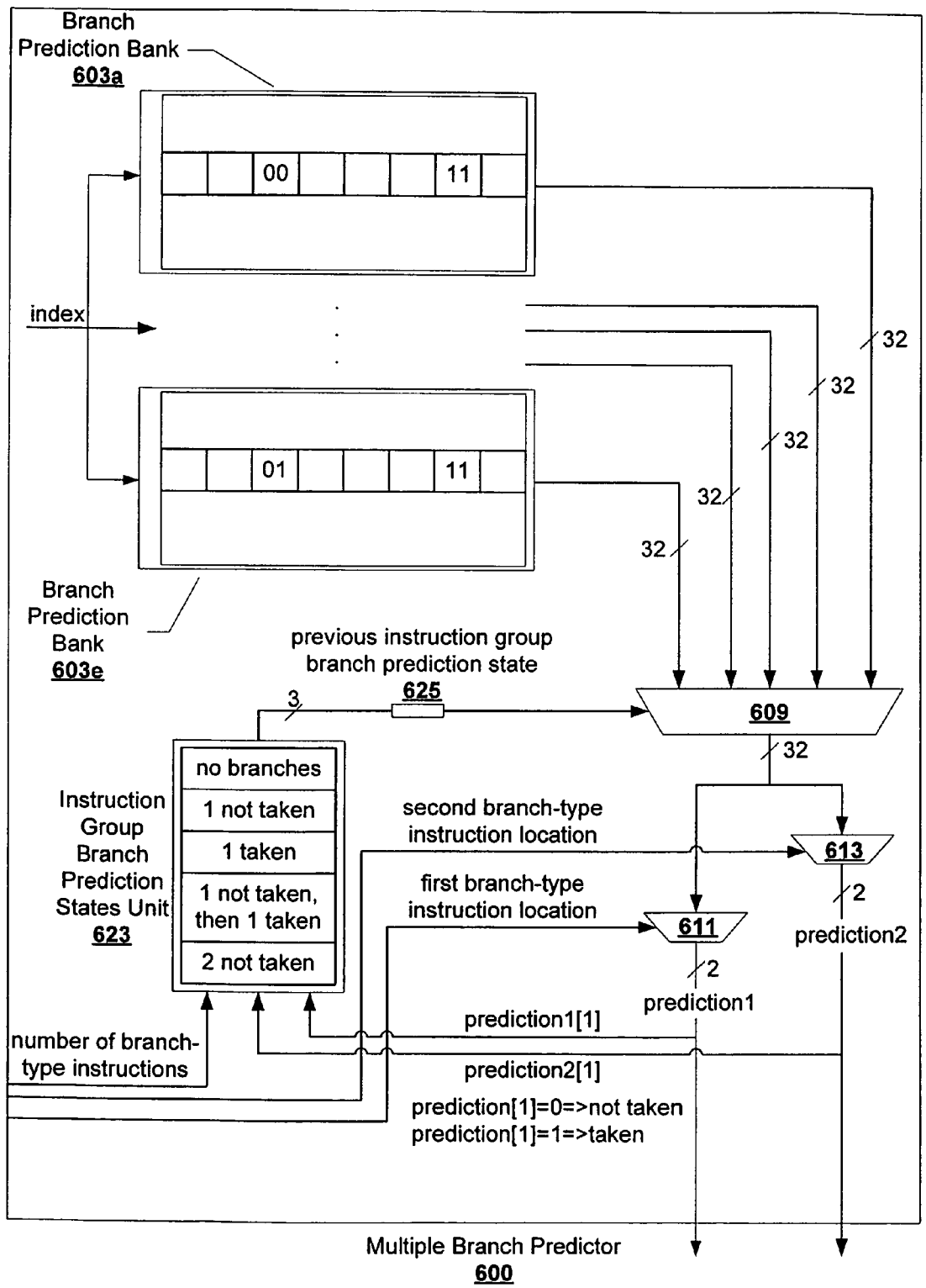
FIG. 6 depicts an exemplary multiple branch predictor.

FIG. 6 depicts an exemplary multiple branch predictor. A multiple branch predictor 600 includes branch prediction banks 603a-603e, various select elements (e.g., multiplexers), a store element 625 for a previous instruction group branch prediction state, and an instruction group branch prediction states unit 623. The organization of the elements of the exemplary multiple branch predictor 601 is illustrated to aid in understanding the described invention and not meant to limit the described invention. For example, the individual branch prediction banks may be distinct from each other, a single contiguous store element with multiple access ports, etc. One of ordinary skill in the art will appreciate the various sizes of data in FIG. 6 are provided for illustrative purposes alone, and that various realizations of the described invention may implement instructions of various sizes, instruction group branch prediction states of various sizes, branch predictions of various sizes, etc. The branch prediction banks 603a-603e are accessed in accordance with an index that corresponds to a current instruction group. A plurality of branch prediction entries (e.g., a row of branch predictions) is selected from each of the branch prediction banks 603a-603e. The branch predictions entries from each of the branch prediction banks 603a-603e flow into a select element 609. In FIG. 6, each row of a branch prediction bank corresponds to an instruction group. Each entry of each row corresponds to an instruction of an instruction group. The select element 609 receives a control signal from a store element 625, which controls which of the branch prediction banks 603a-603e is selected. The store element 625 hosts a previous instruction group branch prediction state, which is stored in the store element 625 from an instruction group branch prediction states unit 623, which will be described in more detail below. Various realizations of the described invention implement deterministic techniques to drive selection of the select element 609 and avoid non-deterministic selection of branch predictions. For example, information may be utilized to weigh selection of the branch prediction banks in accordance with observed behavior (e.g., the modulus of the previous instruction group branch prediction state indication is used to select a branch prediction bank). Hence, selection of the branch prediction banks is determinative and not random. The determinative aspect allows reliance on consistency. Thus, when looping back through a same piece of code, the branch prediction should be consistent and not vary in relation to processing factors, such as load on a shared fetch unit.

After the desired branch prediction bank is selected, the row of the selected branch prediction bank flows into select elements 611 and 613. The select element 611 receives as control input the location of a first branch-type instruction within the current instruction group. The prediction information for the first branch-type instruction of the current instruction group is selected and is supplied for further processing of the corresponding branch-type instruction. Likewise, the select element 613 receives as control input the location of a second branch-type instruction within the current instruction group. The prediction information for the second branch-type instruction of the current instruction group is selected accordingly and supplied for further processing of the second branch-type instruction, if applicable.

The portion of the prediction information that indicates whether the branch of the corresponding branch-type instruction is taken or not taken is pulled and forwarded to the instruction group branch prediction states unit 623. In the exemplary illustration of FIG. 6, the most significant bit of 2-bit branch predictions is pulled.

The instruction group branch prediction states unit 623 stores indications of 5 possible branch prediction states for an instruction group. In the exemplary illustration of FIG. 6A, the multiple branch predictor 600 is implemented for generating branch predictions for 2 branch-type instructions in an instruction group. Various realizations of the described invention may implement a multiple branch predictor that concurrently branch predicts for a fewer or greater number of branch-type instructions, and implement the number of branch prediction banks, which correspond to the instruction group branch prediction states, and the instruction group branch prediction states unit 623 accordingly. In FIG. 6, the instruction group branch prediction states unit 623 indicates the following instruction group branch prediction states: no branches (there were no branch-type instructions within the instruction group); 1 taken (there was one branch-type instruction and it was predicted taken); 1 not taken (there was one branch-type instruction and it was predicted not taken); 1 not taken, then 1 taken (there were at least two branch-type instructions, the first was predicted not taken and the second was predicted taken); and 2 not taken (there were 2 branch-type instructions and both were predicted not taken). There are more possible instruction group branch prediction states (e.g., 2 taken), but they can be decomposed into the preceding instruction group branch prediction states. The branch predictions for the current instruction group along with the number of branch-type instructions in the current instruction group are input into the instruction group branch prediction states unit 623. The appropriate instruction group branch prediction state indication is selected and stored in the store element 625. This stored instruction group branch prediction state serves as the previous instruction group branch prediction state for the next instruction group.

Assume that branch prediction in accordance with FIG. 6 occurs over three pipeline stages and that a fetch unit is shared between two pipelines. In a first stage (F1) an instruction store (e.g., instruction store 107 or 205) is accessed to fetch a first instruction group that includes one or more branch-type instructions for a first pipeline. A branch prediction array, such as the branch prediction array 311 of FIG. 3, is also accessed in stage F1 to retrieve branch predictions for the first fetched instruction group. After the first instruction group is fetched, the shared fetch unit fetches for a second pipeline. When the fetch unit returns to the first pipeline, the instruction store is accessed to fetch a second instruction group for the first pipeline, as well as the branch prediction array being accessed for the second instruction group. The delay introduced by the fetch unit fetching for another pipeline, as well as the selection of the multiple possible branch predictions for the second instruction group, allows the branch predictions for the first instruction group to be available for branch prediction of the second instruction group. Hence, the combination of the alternation between pipeline by the shared fetch unit and the selection of multiple candidate branch prediction prior to selection of the actual branch prediction, synchronizes the branch prediction fetching in the high performance processing environment and avoids the branch predictor from lagging behind.

The above example is provided to aid in understanding the described invention and not meant to be limiting upon the invention. Deterministic branch prediction for multiple branches can be implemented regardless of the number of pipelines. Regardless of technique or environment, a preceding branch prediction is available after selection of multiple entries from the branch prediction array, and the eventual selection of the appropriate branch predictions taking into consideration the preceding branch prediction. To avoid non-deterministic branch prediction, the branch history register does not include the preceding branch prediction. A mechanism separate from the branch history register (as illustrated in FIG. 5) supplies the branch prediction for a preceding branch type instruction or group of branch type instructions. Hence, a single pipeline can also utilize a mechanism to provide deterministic branch prediction for multiple branch type instructions (e.g., serve other threads while the branch predictions are being read from a branch prediction array, sleep for a given amount of time while the branch predictions are being read from a branch prediction array, etc.).

Figure 7:
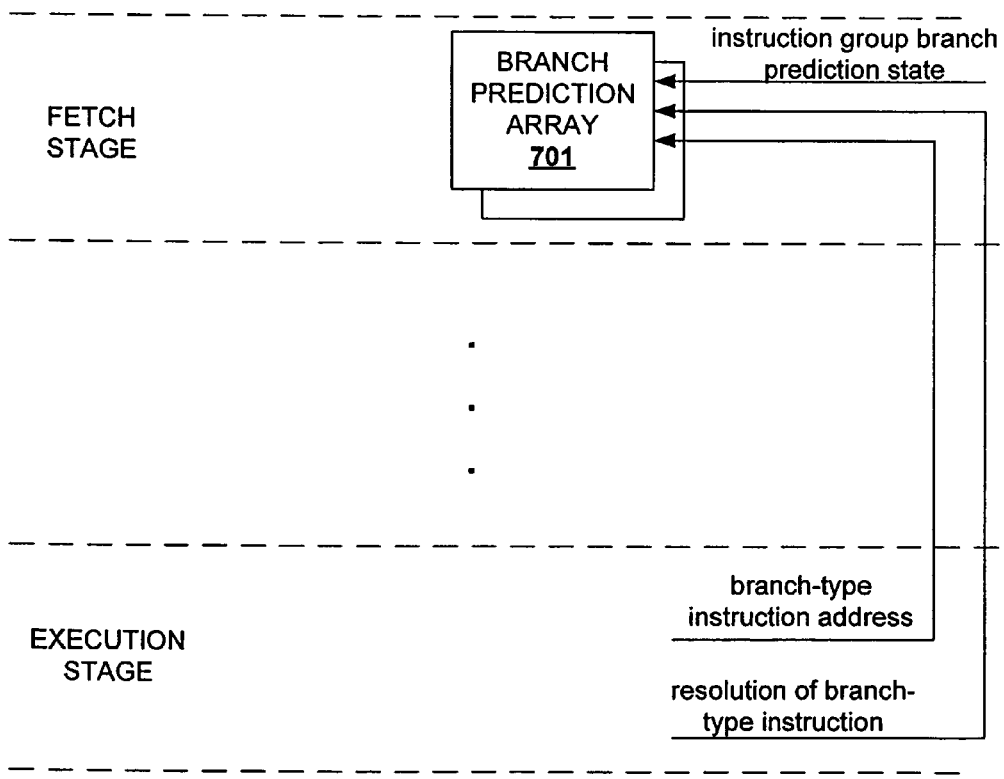
FIG. 7 depicts exemplary updating of a branch prediction array 701.

FIG. 7 depicts exemplary updating of a branch prediction array 701. At an execution stage, branch-type instructions are resolved. The resolution of the branch-type instructions are sent to the branch prediction array 701 along with additional information for locating the appropriate one or more entries. The address of the resolved branch-type instruction is supplied from the execution stage back to the branch prediction array 701 in the fetch stage. The address of the branch-type instruction (e.g., the program counter) and the relevant instruction group branch prediction state are utilized to update the branch prediction array 701 with the branch-type instruction resolution.

Figure 8:
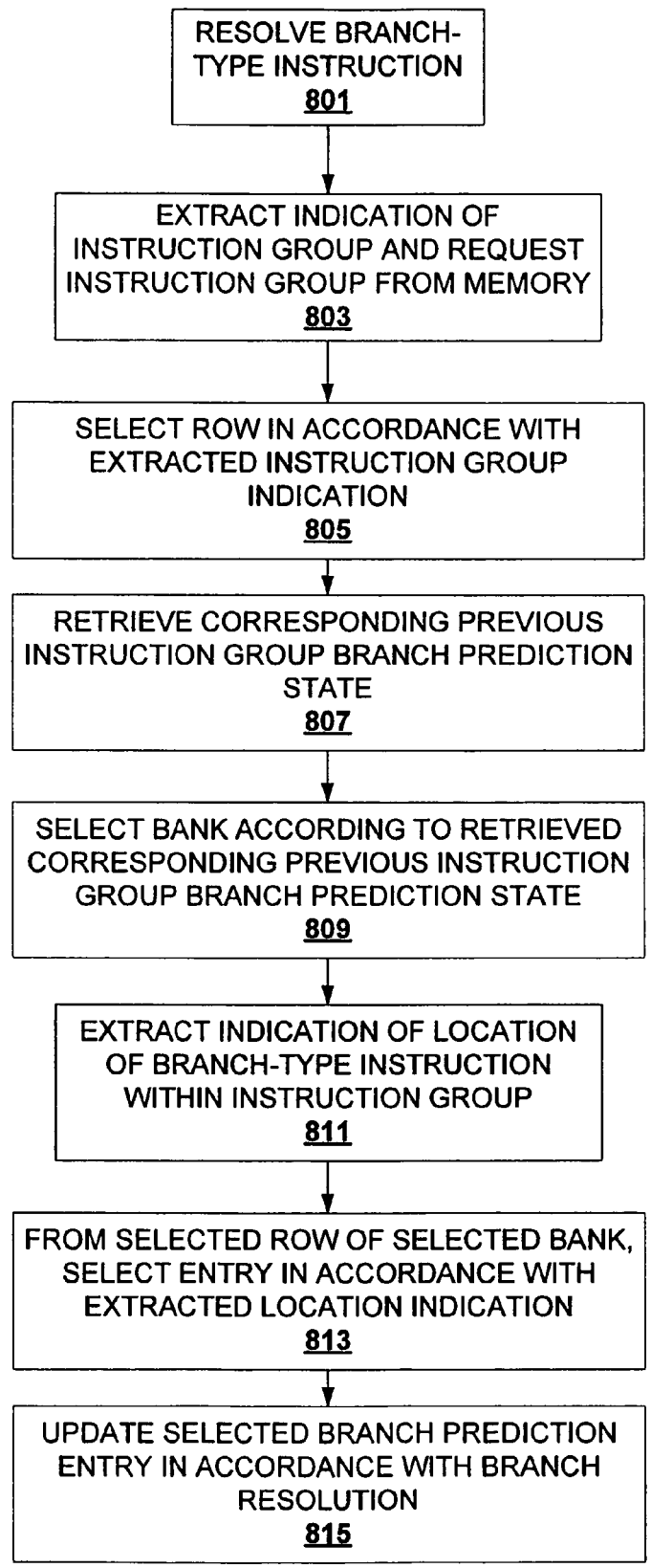
FIG. 8 depicts an exemplary flowchart for updating a branch prediction array.

FIG. 8 depicts an exemplary flowchart for updating a branch prediction array. At block 801, a branch-type instruction is resolved. At block 803, an indication of the instruction group is extracted from the branch-type instruction (e.g., certain number of most significant bits of the program counter) and the indicated instruction group is requested from memory (e.g., the instruction group is retrieved from cache). At block 805, a row is selected from all banks in accordance with the extracted instruction group indication (i.e., the same row is selected across all banks). At block 807, a corresponding previous instruction group branch prediction state is retrieved. Various realizations of the described invention implement techniques for locating the appropriate entry in a branch prediction array for updating. For example, a separate data structure is maintained to track branch predictions that have not been verified. In another example, the branch-type instructions are tagged with location information. Tagging branch-type instructions would not add overhead since the instruction store accommodates sufficient space for instruction types that require more information than a branch-type instruction. Hence, an entry in an instruction store has space sufficient for the branch-type instruction and one or more tags. At block 809, a branch prediction bank is selected according to the retrieved corresponding previous instruction group branch prediction state. At block 811, assuming sufficient time has passed for the requested instruction group to be retrieved from memory, an indication of the location of the branch type instruction(s) within the instruction group is extracted. At block 813, from the selected row of the selected bank, a branch prediction entry is selected in accordance with the extracted location indication. At block 815, the selected entry is updated in accordance with the branch resolution.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, block 503 may be performed in parallel with block 505-517; blocks 505-517 maybe performed before block 503; etc.

The described invention may be provided as a computer program product that may include a machine-readable medium having stored thereon instructions, which may be used to program a computer system (or other electronic devices) to perform a process according to the present invention. A machine readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (PAN); erasable programmable memory (e.g., EPROM and EEPROM); flash memory; or other types of medium suitable for storing instructions.

Figure 9:
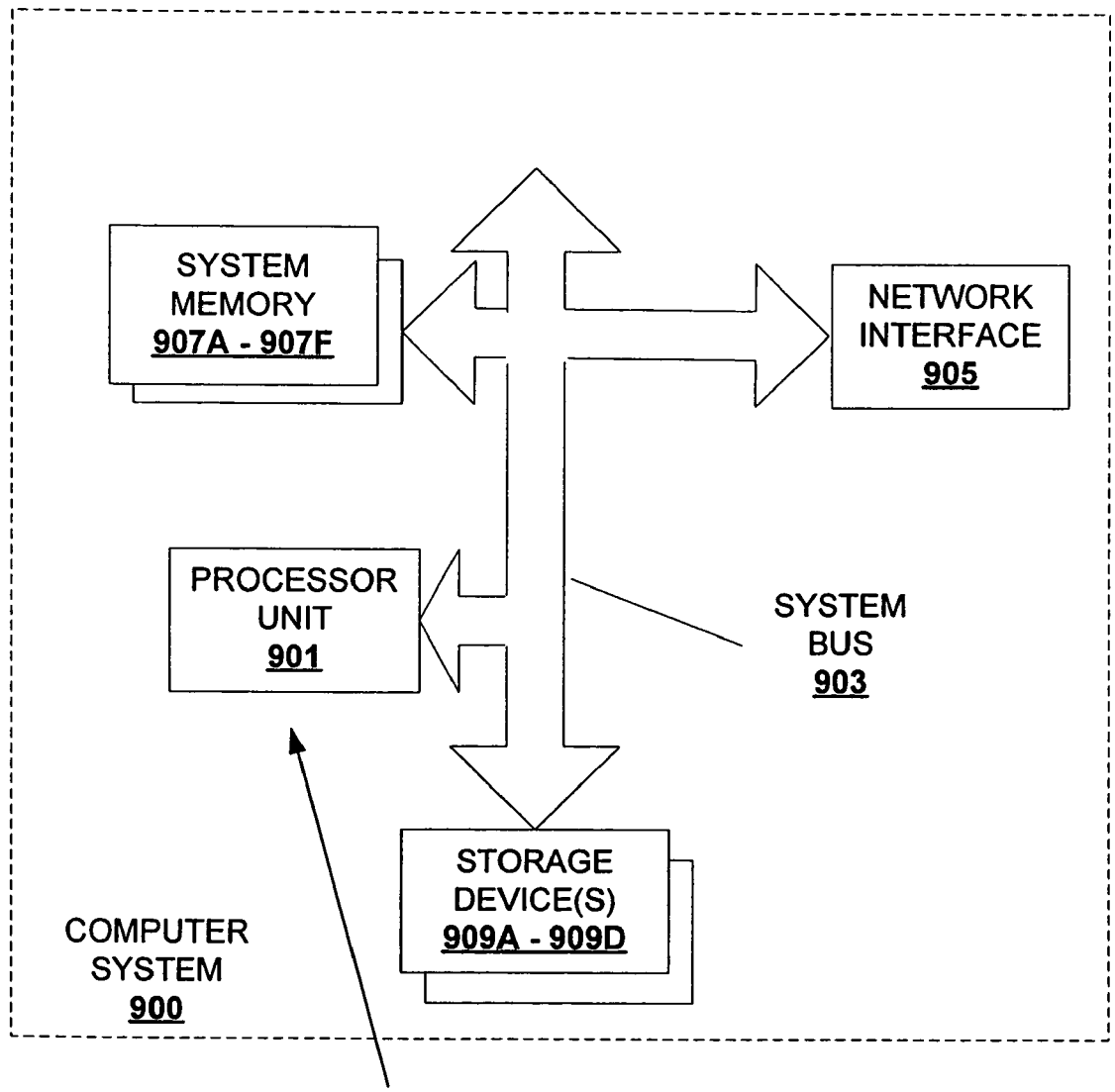
FIG. 9 depicts an exemplary computer system according to realizations of the invention.

FIG. 9 depicts an exemplary computer system according to realizations of the invention. A computer system 900 includes a processor unit 901 (possibly including multiple processors, a single threaded processor, a multi-threaded processor, a multi-core processor, etc.). The computer system 900 also includes a system memory 907A-907F (e.g., one or more of cache, SRAM (Static Random Access Memory), DRAM (Dynamic Random Access Memory), RDRAM (Rambus DRAM), EDO RAM (Extended Data Output Random Access Memory), DDR RAM (Double Data Rate Random Access Memory), EEPROM (Electrically Erasable Programmable Read Only Memory), etc.), a system bus 903 (e.g., LDT (Lightning Data Transport), PCI (Peripheral Component Interconnect), ISA (Industry Standard Architecture), etc.), a network interface 905 (e.g., an ATM interface, an Ethernet interface, a Frame Relay interface, etc.), and a storage device(s) 909A-909D (e.g., optical storage, magnetic storage, etc.). Realizations of the invention may include fewer or additional components not illustrated in FIG. 9 (e.g., video cards, audio cards, additional network interfaces, peripheral devices, etc.).

The processor unit 901, the storage device(s) 909A-909D, the network interface 905, and the system memory 907A-907F are coupled to the system bus 903. The processor unit 901 includes a multiple branch predictor that concurrently branch predicts for multiple branch-type instructions and an out-of-order fetch unit.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology. For example, an operation fetch unit may be referred to as an instruction fetch unit, an instruction buffer may perform some or all of the functionality of the operation fetch unit, the operation scheduling unit, and/or the renaming unit, the memory disambiguation buffer may be referred to as a data hazard resolution unit, the memory disambiguation buffer may include a data hazard resolution unit, etc.

These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processing unit including:
   a fetch unit;
   a multiple branch predictor, coupled to said fetch unit to receive an index, comprising:
      an instruction group branch prediction array which includes a plurality of instruction group branch prediction banks that each correspond to a respective one of a plurality of instruction group branch prediction states,
      wherein each of the instruction group branch prediction banks include a plurality of rows;
      each of the rows corresponding to a different instruction group, and each row having an entry for each instruction of the corresponding instruction group;
      each instruction group including a first plurality of branch instructions;
      each of the rows including a branch prediction for each branch instruction in the first plurality of branch instructions; and
      said instruction group branch prediction array outputs a row of entries, from each bank in said plurality of instruction group branch prediction banks, corresponding to said index, a storage element storing a previous
   instruction group branch prediction state for a last observed instruction group including a second plurality of branch instructions, wherein said first plurality and said second plurality are a same number of branch instructions and said previous instruction group branch prediction state is defined by pulling each branch prediction for each branch instruction in a concurrent branch prediction for the second plurality of branch instructions and by using directly at least said branch predictions themselves for said second plurality of branch instructions in selecting said previous instruction group branch prediction state without determining actual branch behaviors for said second plurality of branch instructions,
      wherein said multiple branch predictor concurrently branch predicts for said first plurality of branch-type instructions of an instruction group with one or more branch predictions, from one of the branch prediction banks, selected using at least said previous instruction group branch prediction state for said last observed instruction group, wherein said last observed instruction group was concurrently branch predicted by said multiple branch predictor, after being fetched by said fetch unit, immediately and directly before said instruction group was processed by said multiple branch predictor, after being fetched by said fetch unit.

2. The processing unit of claim 1 further comprising additional one or more instruction group branch prediction arrays, wherein each of the branch prediction arrays corresponds to a different executing entity, wherein an executing entity includes one of a thread and a core.

3. The processing unit of claim 1, wherein the plurality of instruction group branch prediction states at least include no branches, one branch taken, one branch not taken, one branch not taken followed by one branch taken, and two branches not taken.

4. The processing unit of claim 3 further comprising a last observed instruction group branch prediction state logic to output said previous instruction group branch prediction state to be used for a next instruction group, wherein the output is based, at least in part, on branch predictions from a current instruction group and the number of branch-type instructions within the current instruction group, wherein the last observed instruction group branch prediction state logic is then updated with another previous instruction group branch prediction state in accordance with branch predictions of the next instruction group.

5. The processing unit of claim 1 wherein said fetch unit is capable of fetching instructions out-of-order.

6. The processing unit of claim 5, wherein the processing unit includes a plurality of fetch buffers for out-of-order instruction fetching.

7. The processing unit of claim 6, wherein the plurality of fetch buffers correspond to executing entities.

8. The processing unit of claim 7, wherein the executing entities include one or more of cores and threads.

9. The processing unit of claim 1 further comprising a hashing unit to generate indices into the instruction group branch prediction arrays from instruction group addresses.

10. The processing unit of claim 9 further comprising a plurality of branch history registers, wherein the hashing unit hashes an instruction group address and a corresponding branch history from the branch history registers.

11. The processing unit of claim 10, wherein each of the plurality of branch history registers corresponds to a different executing entity.

12. The processing unit of claim 1 further comprising an instruction group scanning logic operable to scan an instruction group and output a number of branch-type instruction in the scanned instruction group and output location of any branch-type instructions in the scanned instruction group.

13. A method of concurrently predicting for multiple-branch type instructions in an instruction group, the method comprising:
   concurrently branch predicting by a multiple branch predictor of a computer processor, for multiple branch-type instructions within a current instruction group using at least an instruction group branch prediction state itself of an immediately and directly preceding instruction group to define a previous instruction group branch prediction state, wherein said previous instruction group branch prediction state is used to select one set of branch predictions for said multiple branch instructions without determining actual branch behaviors for said immediately and directly preceding instruction group, wherein said one set of branch predictions is included in a plurality of sets of branch predictions, wherein the plurality of sets of branch predictions corresponding to the current instruction group, wherein each set of the plurality of sets of branch predictions corresponds to a respective one of a plurality of instruction group branch prediction states; and said immediately and directly preceding instruction group was concurrently branch predicted, after being fetched by a fetch unit, immediately and directly before said current instruction group was processed by said multiple branch predictor after being fetched by said fetch unit and; and fetching, by said fetch unit, based on said branch predicting for said current instruction group wherein said fetching is with improved branch prediction reliability over a branch predictor that utilizes a branch history register for branch prediction.

14. The method of claim 13, wherein branch predicting for the current instruction group comprises:
selecting the plurality of sets of branch predictions;
selecting the utilized one set of the selected plurality of sets of branch predictions; and
selecting from the utilized one set of branch predictions, those entries that correspond to branch-type instructions of the current instruction group, wherein each entry of the utilized one set of branch predictions corresponds to a respective instruction in the current instruction group.

15. The method of claim 14, wherein the plurality of sets of branch predictions are selected based, at least in part, on an address of the current instruction group.

16. The method of claim 15, wherein the selection of the plurality of sets of the branch predictions is further based, at least in part, on branch history information.

17. The method of claim 14, wherein those of the selected entries are selected based, at least in part, on locations of the branch-type instructions within the current instruction group.

18. The method of claim 13, wherein the plurality of instruction group branch prediction states at least includes no branches, one branch taken, one branch not taken, branch not taken followed by branch taken, or two branches not taken.

19. The method of claim 13, further comprising determining an instruction group branch prediction state for the current instruction group based, at least in part, on the branch predicting and a number of branch-type instructions in the current instruction group.

20. The method of claim 13 further comprising updating with the indicated branch predictions predecode branch prediction information of the branch-type instructions of a subsequent instruction group, wherein the predecode branch prediction information is compiler generated.

21. The method of claim 13 further comprising scanning the current instruction group to determine a number of branch-type instructions within the current instruction group and locations of at least some of the branch-type instructions within the current instruction group.

22. The method of claim 13, wherein the branch prediction information indicates whether branches are taken or not taken.

23. The method of claim 13 embodied as one or more computer-readable storage medium having embodied therein computer readable instructions for the method wherein execution of said computer readable instructions results in the method.

24. A method comprising:
fetching a first instruction group by a fetch unit of a computer processor;
scanning, on said computer processor, said first instruction group to determine contents of the first instruction group including a first plurality of branch-type instructions;
selecting, on said computer processor, branch predictions that correspond to the first plurality of branch-type instructions in the first instruction group based, at least in part, on the first plurality of branch-type instructions of the first instruction group and branch predictions themselves for a second plurality of branch-type instructions of a second instruction group, wherein said second instruction group, after being fetched by said fetch unit, immediately and directly preceded the first instruction group for selecting said branch predictions so that said selecting is determinative and not random for multiple branches irrespective of a number of pipelines in said computer processor, wherein said first plurality and said second plurality are a same number of branch-type instructions; and
providing said branch predictions to said selecting branch prediction for selection of branch predictions that correspond to the first plurality of branch-type instructions in a next instruction group immediately following said first instruction group without determining actual branch behaviors for said first plurality of branch instructions in the first instruction group.

25. The method of claim 24, wherein the branch prediction results at least include one branch taken, one branch not taken, two branches not taken, no branches, or branch not taken followed by branch taken.

26. The method of claim 25, wherein the branch predictions comprise entries organized into banks, wherein each of the branch prediction banks corresponds to one of the possible branch prediction results.

27. The method of claim 26, wherein said selecting the branch predictions comprises:
selecting a row of branch prediction entries from each of the branch prediction banks based, at least in part, on an address of the first instruction group; and
selecting one of the branch prediction banks based, at least in part, on the branch prediction results of the second instruction group.

28. The method of claim 27, wherein selection of one of the branch prediction banks weighed in accordance with a determinative scheme that reflects increased access of particular ones of the branch prediction banks.

29. The method of claim 27, wherein the selection of the branch prediction entries from each of the branch prediction banks and generation of the branch prediction results of the second instruction group occur in a first time period.

30. The method of claim 29, wherein selection of one of the branch prediction banks occurs in a second time period.

31. The method of claim 24, wherein the branch prediction entries are selected concurrently.

32. The method of claim 24, wherein said scanning determines a number of said branch-type instructions occurring in the first instruction group and locations of said branch-type instructions within the first instruction group, if relevant.

33. An apparatus comprising:
a fetch unit; and a multiple branch predictor, coupled to said fetch unit, comprising:
  a branch prediction array that includes a plurality of branch prediction banks, each of the plurality of branch prediction banks corresponding to a respective one of a plurality of instruction group branch prediction states, the branch prediction array operable to concurrently output instruction group branch predictions for a first plurality of branch instructions from each of the plurality of branch prediction banks in accordance with indication of an instruction group fetched by said fetch unit and being processed by said multiple branch predictor; and
  a selector coupled to receive the output from the branch prediction array and coupled to receive a control signal that corresponds to a previous instruction group branch prediction state for a second plurality of branch instructions of an immediately and directly preceding instruction group selected by the selector, the selector operable to select instruction group branch predictions from one of the plurality of banks in accordance with the control signal, wherein said immediately and directly preceding instruction group, after being fetched by said fetch unit, was processed by said multiple branch predictor immediately and directly before said instruction group and further wherein said first plurality and said second plurality are a same number of branch-type instructions and still further wherein said previous instruction group branch prediction state is defined by pulling each branch prediction for each branch instruction in a concurrent branch prediction for the second plurality of branch instructions and by using directly at least said branch predictions themselves for said second plurality of branch instructions in selecting said previous instruction group branch prediction state without determining actual branch behaviors for said second plurality of branch instructions.

34. The apparatus of claim 33, further comprising a store element operable to indicate the plurality of instruction group branch prediction states and coupled to output one of the plurality of instruction group branch prediction states to the selector in accordance with branch predictions of the preceding instruction group and indication of a number of branch-type instructions in the preceding instruction group.

35. The apparatus of claim 34, wherein the instruction group branch prediction states at least include no branches, one branch not taken, one branch taken, one branch not taken followed by one branch taken, and two branches not taken.

36. The apparatus of claim 34 further comprising:
  a store unit operable to host the instruction group branch prediction state of the preceding instruction group.

37. The apparatus of claim 34, further comprising a first and a second select logic coupled to receive instruction group branch predictions selected by the selector and each coupled to receive respective location indications of a first and second branch-type instructions, if any, within the current instruction group, the first and second select logic operable to select and output branch predictions from the instruction group branch predictions accordingly.

38. The apparatus of claim 33, further comprising:
  a branch history register; and
  a hashing unit coupled with the branch history register, the hashing unit operable to receive branch history information input and to hash branch history information input with an instruction address and to output the hashed value as an index into the branch prediction array.

39. The apparatus of claim 38 further comprising a translation buffer coupled with the hashing unit and operable to supply instruction addresses to the hashing unit.

40. The apparatus of claim 39 further comprising an arbiter to control selection of instruction addresses from a plurality of executing entities.

41. The apparatus of claim 33 wherein said fetch unit is operable to fetch instructions out-of-order from an instruction store; and
  a plurality of fetch buffers coupled with the fetch unit, the plurality of fetch buffers operable to host instruction groups fetched by the fetch unit.

42. The apparatus of claim 41, wherein the plurality of fetch buffers host instructions for one or more of threads and processing units.

43. An apparatus comprising:
  an instruction store; and
  means for concurrently branch predicting for multiple branch-type instructions of a current instruction group based, at least in part, on one of a plurality of instruction group branch prediction states themselves for multiple branch-type instruction of an immediately and directly preceding instruction group without determining actual branch behaviors for said immediately and directly preceding instruction group, and a number of branch-type instructions in the multiple-branch type instructions of the immediately and directly preceding instruction group wherein the immediately directly preceding instruction group was fetched before the current instruction group was fetched.

44. The apparatus of claim 43 further comprising means for fetching instructions from the instruction store out-of-order.

45. The apparatus of claim 43 wherein the plurality of instruction group branch prediction states at least include no branches one branch not taken, one branch taken, one branch not taken followed by one branch taken, and two branches not taken.

46. A system comprising:
  a network interface;
  system memory; and
  at least one processing unit that includes a plurality of branch prediction arrays, each of the plurality of branch prediction arrays having a branch prediction bank for each of a plurality of instruction group branch prediction states, each of the plurality of branch prediction arrays corresponding to a different execution entity executing on a different execution unit so that the processing unit is operable to concurrently execute multiple threads, the processor operable to allocate an entry from each branch prediction bank of one of the plurality of branch prediction arrays for branch predictions for multiple branch instructions in an instruction group and to select one entry using branch predictions themselves from an entry selected for an immediately preceding instruction group without determining actual branch behavior for said immediately preceding instruction group.

47. The system of claim 46 further comprising a system bus coupled with the network interface, the system memory, and the processing unit.

48. The system of claim 46 further comprising a second processing unit.

* * * * *

UNITED STATES PATENT AND TRADEMARK OFFICE
CERTIFICATE OF CORRECTION

PATENT NO. : 7,590,830 B2  
APPLICATION NO. : 11/068626  
DATED : September 15, 2009  
INVENTOR(S) : Paul Caprioli and Shailender Chaudhry Page 1 of 1

It is certified that error appears in the above-identified patent and that said Letters Patent is hereby corrected as shown below:

On the Cover page, Item 12, Line 2, replace "Chaudhry et al." with --Caprioli et al.--; and
On the Cover page, Item 75, replace "Shailender Chaudhry, San Francisco, CA (US); Paul Caprioli, Mountain View, CA (US)" with --Paul Caprioli, Mountain View, CA (US); Shailender Chaudhry, San Francisco, CA (US)--.

Signed and Sealed this

Twenty-second Day of December, 2009

David J. Kappos
*Director of the United States Patent and Trademark Office*